US009183511B2

(12) United States Patent
Li et al.

(10) Patent No.: US 9,183,511 B2
(45) Date of Patent: Nov. 10, 2015

(54) SYSTEM AND METHOD FOR UNIVERSAL TRANSLATING FROM NATURAL LANGUAGE QUESTIONS TO STRUCTURED QUERIES

(71) Applicants: Ming Li, Waterloo (CA); Yang Tang, Kitchener (CA); Di Wang, Pittsburgh, PA (US)

(72) Inventors: Ming Li, Waterloo (CA); Yang Tang, Kitchener (CA); Di Wang, Pittsburgh, PA (US)

(*) Notice: Subject to any disclaimer, the term of this patent is extended or adjusted under 35 U.S.C. 154(b) by 255 days.

(21) Appl. No.: 13/776,084

(22) Filed: Feb. 25, 2013

(65) Prior Publication Data
US 2013/0226846 A1 Aug. 29, 2013

Related U.S. Application Data

(60) Provisional application No. 61/602,930, filed on Feb. 24, 2013.

(51) Int. Cl.
*G06N 5/00* (2006.01)
*G06N 99/00* (2010.01)
*G06N 5/02* (2006.01)
*G06F 17/24* (2006.01)
*G06F 17/27* (2006.01)

(52) U.S. Cl.
CPC ............ *G06N 99/005* (2013.01); *G06F 17/248* (2013.01); *G06F 17/278* (2013.01); *G06N 5/02* (2013.01); *G06F 17/2755* (2013.01)

(58) Field of Classification Search
CPC .................................................... G06N 99/005
See application file for complete search history.

(56) References Cited

U.S. PATENT DOCUMENTS

| 6,675,159 | B1 * | 1/2004 | Lin et al. ............................... 1/1 |
| 7,966,305 | B2 * | 6/2011 | Olsen ............................ 707/706 |
| 2003/0126136 | A1 * | 7/2003 | Omoigui ......................... 707/10 |
| 2009/0070322 | A1 * | 3/2009 | Salvetti et al. .................... 707/5 |
| 2010/0070448 | A1 * | 3/2010 | Omoigui ......................... 706/47 |

* cited by examiner

*Primary Examiner* — Alan Chen
(74) *Attorney, Agent, or Firm* — Norton Rose Fulbright Canada LLP; Maya Medeiros

(57) ABSTRACT

A computer implemented question answering (QA) system and method is provided that automatically finds one or more accurate and concise answers for a natural language question. An automated training routine is provided that includes learning a proper mapping from the natural language question to one or more structured queries by discovering and summarizing parallel semantics between a knowledge base and pairs of a natural language question and its answer. The system and method generate as output concise texts answering the natural language question intended by a user.

16 Claims, 3 Drawing Sheets

SYSTEM AND METHOD FOR UNIVERSAL TRANSLATING FROM NATURAL LANGUAGE QUESTIONS TO STRUCTURED QUERIES

PRIORITY

This application claims priority under 35 USC §119(e) of U.S. Provisional Patent Application No. 61/602,930 filed Feb. 24, 2012, the contents of which are hereby incorporated by reference.

FIELD OF THE INVENTION

The present invention relates to methods and systems for processing natural language questions. More particularly, the present invention relates to a system and method for answering natural language questions by translating them into structured queries, such as database queries.

BACKGROUND OF THE INVENTION

With the exponential growth of the Internet, information available on the Internet now covers human knowledge in virtually all aspects. However, the explosive growth of the Internet has also significantly increased the effort and time required for users to find the precise information that they are seeking.

Although traditional search engines such as YAHOO™ and GOOGLE™ can quickly provide users with many thousands or millions of web links related to input keywords, the search results may contain a large number of irrelevant and duplicate content. Consequently, users often have to spend a lot of time manually reviewing multiple sites located by the search results in order to find an answer to their question.

What is needed is an improved system and method for obtaining a highly relevant answer to address some of these limitations.

SUMMARY OF THE INVENTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

Generally, the present invention provides system and method for answering open-domain natural language questions with a structured knowledge base by translating the natural language questions into structured queries, such as database queries.

In one aspect, a computer implemented knowledge base question and answer (QA) method is provided comprising: (a) recognizing one or more named entities (database entries) in a natural language question; (b) retrieving pre-trained possible relationship (predicate) mappings using the rest of question excluding named entities; (c) constructing structured queries in accordance with the natural language question's logical representation including Boolean algebra performed on a Basic Graph Pattern (BGP) translation and nested queries; (d) sorting possible structured queries with a score combing the confidence of named entities recognition (NER), the confidence of BGP translation, and the confidence of the nested queries; and (e) building natural language answers with one or more queried outputs.

In another aspect, there is provided a training system and method that automatically learns transformation rules, patterns, and statistics for translating natural language questions into structured queries. In an embodiment, the present system and method integrates a knowledge base with training pairs of questions and answers, which discovers and links textual patterns with semantic relationships.

In another aspect, a computer implemented question answering method is provided, comprising: receiving or accessing a natural language question; recognizing one or more entity surfaces in the natural language question, and generating one or more corresponding template surface queries; constructing one or more structured queries based on one or more trained models for queried templates and entities; finding and selecting one or more answer phrases using constructed structured queries on a knowledge base; and composing, or initiating the composition, of output based on the one or more answer phrases.

In another aspect, the method provides concise answers to natural language questions using a structured knowledge database.

In another aspect, the constructing of one or more structured queries from trained models and entities comprises: creating a basic graph pattern (BGP) with one or more trained relationship paths and entities; optionally performing Boolean algebra on multiple BGP's to better describe the question intent; and applying context-free grammar (CFG) on template surfaces to build nesting queries.

In a still other aspect, the selecting one or more answer phrases using constructed structured queries comprises: employing a ranking scheme considering following factors: popularity of the templates surface; popularity of entities; probability of relation path corresponding to the template; and the depth of the nesting structured queries.

In another aspect, a computer system for automatically learning mappings from a natural language question to a structured query is provided, comprising: one or more computer systems, linked to a question answering system, the question answering system including: a named entity recognizer for detecting one or more entity surfaces in input text so as to link a text phrase to a knowledge concept; a training utility for searching and organizing one or more mappings from a template surface to one or more relationship paths; and a training post-processing utility for normalizing and optimizing trained mapping distributions for one or more templates.

In another aspect, the question answering system permits concise answers to natural language questions using a structured knowledge database.

In a still other aspect, the named entity recognizer when executed: extracts entity surfaces from one or more webpage links to each knowledge concept; builds a prefix-tree based dictionary on extracted entity surfaces to link knowledge concepts; and searches inputted text with a surface dictionary to identity one or more potential knowledge concepts.

In a still other aspect, the post-processing utility when executed: performs morphological normalization on template surfaces; merges predicate distributions of templates sharing major semantic mappings that are proximate to one another based on term frequency inverse document frequency distance; and applies matrix de-noising and correlation analysis techniques such as PCA and LSI on trained relationship path distributions for templates.

In another aspect, a computer system for automatically learning mappings from a natural language question to a structured query so as to enable obtaining an answer from a structured knowledge base based on the natural language question is provided, comprising: one or more computer systems, linked to a question answering system, the question answering system including or being linked to a set of structured query templates, wherein the question answering system when executed: analyzes one or more natural language queries to generate one or more entity surfaces by accessing a named entity recognition (NER) utility; matches the one or more entity surfaces to one or more of the templates by applying NER to the one or more templates and applying a matching operation; estimating predicates by determining a relationship path distribution between the entity surfaces and the matched templates; constructing one or more basic graph patterns (BGPs); and generating a structured query based on the natural language query based on the one or more BGPs.

In another aspect, a computer system includes an NER module that both analyzes the natural language queries and trains the templates.

In a still further aspect, the question answering system when executed automatically learns mapping rules, patterns or statistics so as to define one or more relationship paths between a question, an associated answer, and the knowledge base.

In a still other aspect, the question answering system merges two or more related templates, thereby merging the predicate distributions associated with the templates.

In another aspect of the invention, the question answering system applies a term frequency inverse document frequency operation in order to determine whether the two or more templates are related.

In a still other aspect, the question answering system generates two or more structured queries, and these are ranked using one or more ranking operations.

In yet another aspect, the ranking of the structured queries is based on ranking score calculated each structured query based on one or more of: popularity of associated templates surfaces; popularity of associated entity surfaces; probability of applicable relation paths corresponding to the templates; and depth of the nesting structured queries.

In a still other aspect of the computer system of the present invention, the question answering system applies a predetermined threshold which if exceeded, the structured queries are used to return the answer phrase, otherwise the computer system generates further results.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Figure 1:
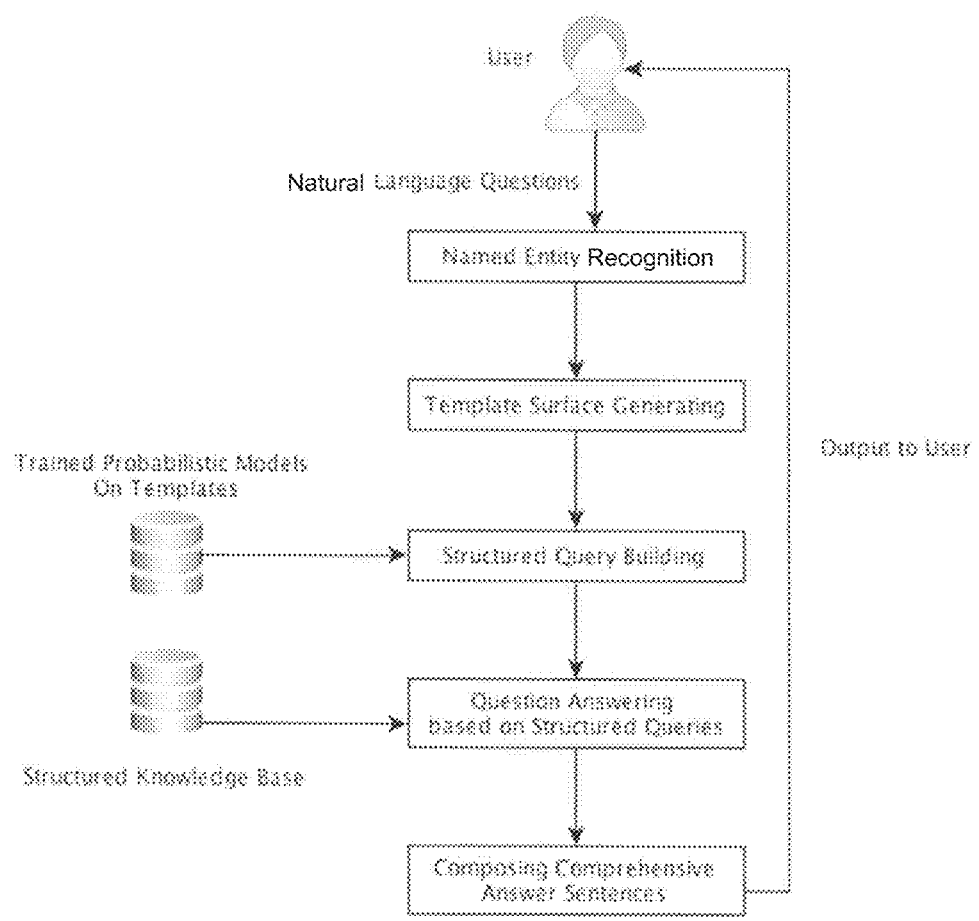
FIG. 1 is a question answering workflow diagram illustrating a representative workflow in accordance with one aspect of the invention.
Figure 2:
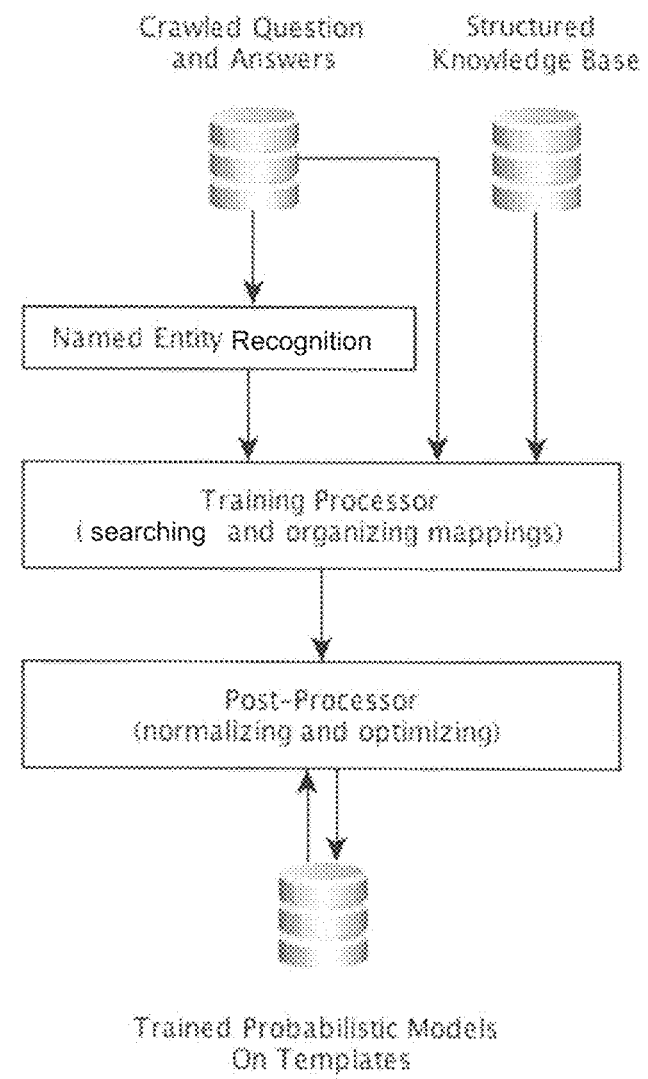
FIG. 2 depicts the workflow of unsupervised training of the mapping from natural language questions to structured queries.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF PREFERRED EMBODIMENTS

The present disclosure relates to a system, method, and a computer network architecture that is able to find concise answers for natural language questions with a structured knowledge base, specifically mapping unstructured natural language questions to structured queries to find a best corresponding answer.

Question answering, or QA, is a newly developing information retrieval technique that promises to considerably reduce the amount of time required to find a concise and accurate answer for questions posed in natural language. The rise of semantic web tools has also provided a platform for users to generate and share knowledge in a wide variety of areas. In recent years, large structured knowledge bases have been built, such as those found in Linked Open Data, which already contain billions of Resource Description Framework (RDF) triples and acts as a rich source of knowledge for diverse user needs. (An RDF triple contains three components: a subject, a predicate and an object. The subject is an RDF URI reference or a blank node; the predicate is an RDF URI reference; and the object is an RDF URI reference, a literal or a blank node.)

To bring the advantages of these and other valuable sources of knowledge to Internet users, there is a need for technology solutions that enable users to find concise answers to natural language questions by accessing a structured knowledge base that is easy and simple to use and overcomes the inherent limitations of structuring queries directed to a structured knowledge base.

In one aspect of the invention, a novel and innovative computer system and computer implemented method is provided for allowing users to define their queries using natural language, analyzing these queries, and based on this analysis retrieving answers from a structured knowledge base. In another aspect of the invention, a natural language interface and associated computer implemented method is provided for enabling concise answers to natural language questions applied to a structured knowledge database.

A skilled reader will know that there are several challenges in providing the computer system and computer implemented method described.

One such challenge is in recognizing various entities in an unstructured question and associating those named entities with their corresponding entries in the knowledge base. A word or phrase in the unstructured question may often ambiguously imply various database entries. For example, the word "Obama" can refer to both "Barack Obama (44th President of the United States)" and "Barack Obama, Sr (Kenyan economist and father to President Obama)". A second challenge is the mapping from each question's semantic intention of entities to database relations (the predicate in the triple) and then constructing structured queries. For instance, the question "who is the wife of Bill Clinton" might link to the "spouse" relation to the entity "Bill Clinton" in the certain knowledge base. A third challenge is identifying structured dependencies among database relations such as nesting and Boolean algebra.

Prior art solutions exist that attempt to address the above mentioned challenges. Generally speaking, some prior approaches have involved either (1) manually matching whole input questions to structure queries, or (2) linking keywords in questions to names of entries in the database. The first approach potentially requires a large number of manually developed mappings from questions to structured queries, which typically has a very low recall rate. The second approach often has low precision because of the nature of approximate matching between keywords and entities. Both types of prior approaches tend to provide relatively poor performance especially in large, open-domain knowledge bases. Furthermore, above approaches involve maintaining substantive human-annotated mappings or domain-specific keywords, which makes them very expensive to extend and improve from an implementation perspective. These challenges are a practical obstacle to designing and implementing a robust question answering (QA) system with structured knowledge that is accurate enough for widespread user adoption.

The present system, method and computer program overcomes at least some of the limitations as will now be explained in more detail.

Problem Formulation

As noted above, a knowledge base can be expressed by collection of RDF triples (s, p, o), where "s" refers to the subject; "p" indicates the predicate; and "o" is the object. In knowledge bases, a structured query consisting of a set of triple patterns is known as a basic graph pattern (BGP). Each triple pattern is similar to RDF triples (s, p, o) except that each subject, predicate and object can be a variable. For example, a very basic BGP is a finding o given corresponding s and p, such as a given subject "Bill Clinton" and the predicate "child" to find variable "?children" that would be "Chelsea Clinton".

As input, a natural language question may be provided, comprising a sequence of words $(w_1, \ldots, w_n)$. In the question, an entity surface e is a sub-sequence of words $(w_i, \ldots, w_{i+j})$ that can be considered as a frame f which is a subject or object in the knowledge base.

One goal of the present system and method is to map the plain text question to a structured query. The BGP of the structured query can correspond to all logical constraints in question, and each triple pattern can contain a proper mapping from entity surface to frame, and a mapping from the question to a predicate. After mapping all logical constraints in the question into a BGP, the structured query is expected to return as few as possible results that contain the answer to the question.

Named-Entity Recognition

In many publicly available knowledge bases such as Wikipedia™, each knowledge entry (frame) has its own publicly available URL. Therefore, online web pages such as new, blogs, and Wikipedia itself can add hyperlinks that point to related Wikipedia topic links within its passage. For example, a certain HTML web page might contain a hyperlink as:

<a href="en.wikipedia.org/wiki/George_W._Bush">President Bush</a>, which in Wikitext is equivalent to [[George W. Bush|President Bush]]. As illustrated in an earlier example, "Obama" is a entity surface and the knowledge base topic page "Barack Obama" is an entity. Thus, those surface in hyperlinks act as textual label or textual short expression of an entity.

There are several advantageous features of using such entity surfaces as textual labels of entities. First, various kinds of surfaces may exist for an entity, which covers various possible labels required to describe each entity with sufficient specificity. Second, given a surface, the statistical distribution of pointed entities can act as the probability of each entity on this surface and can help disambiguate the surface. Third, for a given entity, the total number of the reference links indicates the popularity of this entity.

Thus, in one embodiment of the present invention, the computer system and computer implemented method of the present invention builds a dictionary-based Named Entity Recognition (NER) that is implemented using a prefix tree. The surface forms of this NER dictionary are extracted from links of articles from various sources, such as those described above. Since each entity surface can refer to one or more frames in a knowledge base, suppose NER detects entity surface $e=(w_i, \ldots, w_{i+j})$ from $(w_1, \ldots, w_n)$, then it returns a collection of frames F that potentially represents the concept of e. This means that the NER can recognize a known surface in a newly input text and produce a list of possible entities possibly associated with it. In addition, the NER module may also detect date, time, string literals, and other numbers such as monetary values. This NER module can also be used by other modules such as a training module and a question answering module.

Templates Training

After applying NER on an unstructured question text, another challenge to successful translation from a natural language question to a structured query is finding and selecting the proper relationship (i.e. a predicate in RDF triple) to construct a BGP. To overcome this challenge, the present system and method automatically learns mapping rules, patterns, and statistics from the natural language to create proper relationship paths based on questions, answers and the knowledge base.

In one particular implementation of the present invention, the following training program may be used for templates training. The training program may be implemented both as a computer implemented training method, applied to a computer system of the present invention. It may also be implemented as a training computer system which may be linked to one or more other computer system components that implement other functions or features of the present invention.

First, given a pair of a natural language question and its answer, the present system and method can apply NER to both the question and the answer during the training. Second, the training program examines whether there exists a short path, in the graph-based knowledge base representation, between two recognized entities, where one is from the question and another one is from the answer. Third, the training program repeats the previous step such that it exhaustively searches and records all appearances of those short paths in the knowledge graph accompanying the question and the entities information called template surface. Fourth, after finishing the training for all questions, for every template, a distribution over potential predicates is observed.

Practically Speaking, if NER extracts entity surface $e_q=(w_i, \ldots, w_{i+j})$ with entities $F_q$ for the question and ea with entities $F_a$ for the answer, then the training program tries all queries with triple pattern $(f_q, X, f_a)$ where $f_q \epsilon F_q$ and $f_a 2 F_a$. If predicate X fits any of the above queries, the training program records this X appearance associated with template $(w_1, \ldots, w_{i-1}, m, w_{i+j+1}, \ldots w_n)$, where m is a slot marker indicates the type of X.

By going through a large collection of pairs of questions and answers, the training program can obtain a model containing relation (predicate) path distributions on each question template surface. For example, given a template such as "who is the president of ORGANIZATION?", the trained model can return a list of possible predicates with different probabilities such as p(leaderName)=0.5 and p(keyPerson)=0.1.

Normalization and Optimization

A post-processing component of the computer system of the present invention may employ multiple types of normalization and optimization on the trained model results.

In one possible implementation of the post-processing or normalization/optimization component, standard morphological normalization can be applied to the template surfaces. As a result, template surfaces with morphological variations of words are merged together. Distributions associated with those template surfaces can also be combined. For example, template surfaces "who is daughter of PERSON?" and "who were daughters of PERSON?" are normalized and merged to "who be daughter of PERSON?".

In another embodiment, template surfaces within a tf-idf (term frequency inverse document frequency) distance are merged together. The tf-idf is a well-tested statistical measure used to evaluate how important a word is to a document in corpus. Computing tf-idf in the collection of template surfaces can provide empirical observations on each word's weight for reflecting the topic of the template surface. The similarity between word sequences can be defined as the cosine similarity of their if-idf vectors. Further, the distance between word sequences is 1 minus the similarity value. Thus two templates may be combined with their distribution if they satisfy all of the following conditions: 1) they share the same template slot marker (entity type); 2) their relation path (predicate) distribution overlaps in a certain degree; 3) the tf-idf distance between them is near (e.g. less than 0.3). In short, this merges the predicate distributions of those templates sharing major keywords and semantic mappings, which improve the ability of distributions prediction.

Lastly, in another embodiment, the post-process module may employ multiple kinds of matrix analysis, transformation and decomposition on the trained model. Considering each template surface is a row and each relation path of the template is a column, the trained model can be regarded as a matrix. Therefore, matrix analysis techniques can be applied to reduce noises and/or detect correlativeness in relationship path distributions. Such techniques include, but are not limited to, Principal Component Analysis (PCA), Singular Value Decomposition (SVD), Canonical Correlation Analysis (CCA), and Latent Semantic Indexing (LSI).

Question Answering

Given the auto-generated templates model as described above, basic question answering can be performed by matching the natural language query to a template. Similar with the training process, an input question is scanned by NER to generate an entity surface $e=(w_i, \ldots, w_{i+j})$ and input question's template $(w_1, \ldots, w_{i-1}, m, w_{i+j+1}, \ldots, w_n)$. Moreover, multiple entity surfaces detected in the input question can either lead to multiple candidate templates, or one template with several slots. If the normalized input template is matched with at least one of the trained templates, mapping the proper predicates is estimated based on the trained relationship path distribution of matched templates. With frames referred by NER and predicates mapped from trained templates, a group of BGPs can then be generated. Groups of the BGPs might contain one or more BGP conjunctions and may be used to construct a comprehensive structured query.

In one possible implementation of the present invention, the QA method and system of the present invention can find solutions for complex questions containing nested grammar structures. Generally speaking, the templates training process only discovers short relation paths (e.g. less than 3 steps) for training efficiency. To answer complex questions, multiple layers or steps of structured queries are typically needed. One important discover of the inventors is that nested template surfaces are equivalent to the definition question template surfaces. For example, the definition question template surface "who is the daughter of PERSON" and the template surface "where did PERSON graduate from" can be used together for answering questions like "where did the daughter of PERSON graduate from". Therefore, the question answering module applies Context-Free Grammar (CFG) on template surfaces recursively to generate multiple step structured queries and answer complex questions.

Finally, different kinds of structured queries are created with combinations of different candidate entities, candidate relationship paths, template interpretations, and CFG. Those structured queries are ranked based on a score considering the popularity of the templates surface, the popularity of the entities, the probability of a relation path corresponding to the template, and the depth of the nesting structured queries. Then, the system executes queries in decreasing ranked order until one or more valid results are returned. If the returned result's structured query ranking score is higher than a predefined threshold, the results will be returned as the answer phrase.

In another aspect of the present invention, the system and method of the present invention also employs an optional corpus-based answer validation and refines the answer. When potential answers are found using the above mentioned steps or features, each answer and question keyword is examined by co-occurrence in the corpus. If the answer and keywords appear in the same passage frequently, then this answer phrase is validated.

Instead of outputting the answer phrase directly, answer sentences may be composed based on the answer phrase and its corresponding structured query. In one implementation, the system and method of the present invention provides a hand-written answer sentence template for the popular relation path. In another aspect of the present invention, the present system and method is also able to make an answer sentence by learning the relationship description from a corpus by summarizing textual description on known entities' surfaces.

Computing Environment

The description above discloses at a high level the various functions of the proposed control/management solution for a plurality of devices at the location.

Figure 3:
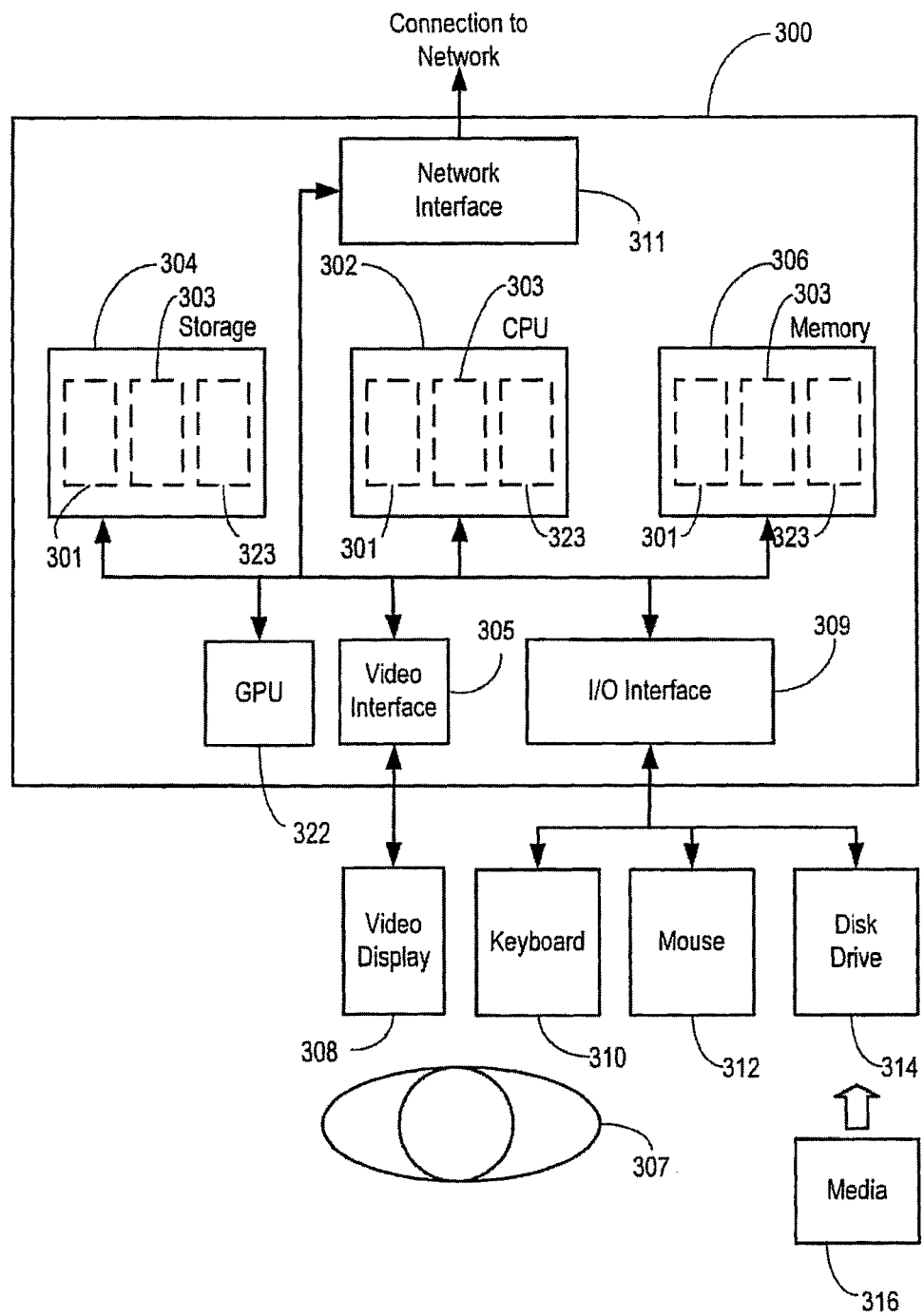
FIG. 3 is an illustrative schematic block diagram of a generic computing device which may provide a suitable operating environment for various embodiments.

In order to provide additional context for various aspects of the subject innovation, FIG. 3 and the following discussion are intended to provide a brief, general description of a suitable computing environment in which the various aspects of the present invention can be implemented.

A suitably configured computer device, and associated communications networks, devices, software and firmware may provide a platform for enabling one or more embodiments as described above. By way of example, FIG. 3 shows a generic computer device 300 that may include a central processing unit ("CPU") 302 connected to a storage unit 304 and to a random access memory 306. The CPU 302 may process an operating system 301, application program 303, and data 323. The operating system 301, application program 303, and data 323 may be stored in storage unit 304 and loaded into memory 306, as may be required. Computer device 300 may further include a graphics processing unit (GPU) 322 which is operatively connected to CPU 302 and to memory 306 to offload intensive image processing calculations from CPU 302 and run these calculations in parallel with CPU 302. An operator 307 may interact with the computer device 300 using a video display 308 connected by a video interface 305, and various input/output devices such as a keyboard 310, mouse 312, and disk drive or solid state drive 314 connected by an I/O interface 309. In known manner, the mouse 312 may be configured to control movement of a cursor in the video display 308, and to operate various graphical user interface (GUI) controls appearing in the video display 308 with a mouse button. The disk drive or solid state drive 314 may be configured to accept computer readable media 316. The computer device 300 may form part of a network via a network interface 311, allowing the computer device 300 to communicate with other suitably configured data processing systems (not shown). One or more different types of sensors may be used to receive input from various sources. The present system, method and apparatus may be practiced on virtually any manner of computer device including, for example, a desktop computer, laptop computer, tablet computer or wireless handheld.

It should be understood that further enhancements to the disclosed system, method and computer program are envisioned.

While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices. For example the knowledge database may be located remotely from a computer device that includes other elements of the correction utility, such that the correction utility queries the database for the cluster of related queries as described above, however the information distance operations described herein may below.

A computer (such as the computer(s) illustrated in the architecture described above) typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer. Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system of the present invention represents a collection of hardware and software elements that enable a user to manage a variety of device and information objects associated or generated by these devices, leveraging in-the-cloud resources in a new way.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Cloud Computing Generally

As mentioned above, the correction utility of the present invention may be implemented as part of a cloud service. "Cloud computing" includes Internet based computing where shared resources, software and data are provided on demand. A "cloud" therefore can refer to a collection of resources (e.g., hardware, data and/or software) provided and maintained by an off-site party (e.g. third party), wherein the collection of resources can be accessed by an identified user over a network. The resources can include data storage services, word processing services, and many other general purpose computation (e.g., execution of arbitrary code) and information technological services that are conventionally associated with personal computers or local servers.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

In general, the concepts of "virtual" and "cloud computing" include the utilization of a set of shared computing resources (e.g. servers) which are typically consolidated in one or more data center locations. For example, cloud computing systems may be implemented as a web service that enables a user to launch and manage computing resources (e.g., virtual server instances) in third party data centers. In a cloud environment, computer resources may be available in different sizes and configurations so that different resource types can be specified to meet specific needs of different users. For example, one user may desire to use small instance as a web server and another larger instance as a database server, or an even larger instance for processor intensive applications. Cloud computing offers this type of outsourced flexibility without having to manage the purchase and operation of additional hardware resources within an organization.

A cloud-based computing resource is thought to execute or reside somewhere on the "cloud", which may be an internal corporate network or the public Internet. From the perspective of an application developer or information technology administrator, cloud computing enables the development and deployment of applications that exhibit scalability (e.g., increase or decrease resource utilization as needed), performance (e.g., execute efficiently and fast), and reliability (e.g., never, or at least rarely, fail), all without any regard for the nature or location of the underlying infrastructure.

A number of factors have given rise to an increase in the utilization of cloud computing resources. For example, advances in networking technologies have significantly improved resource connectivity while decreasing connectivity costs. Advances in virtualization technologies have increased the efficiency of computing hardware by improving scalability and making it possible to more closely match computing hardware resources to the requirements of a particular computing task. Additionally, virtualization technologies commonly deployed in cloud computing environments have improved application reliability by enabling failover policies and procedures that reduce disruption due to an application or hardware failure.

It should be understood that the present invention may be extended by linking the invention with other technologies or processes useful in the monitoring, control or management of a variety of devices, for a variety of purposes.

The invention claimed is:

1. A computer implemented question answering method, comprising:
  (a) receiving or accessing a natural language question;
  (b) recognizing one or more entity surfaces in the natural language question, and generating one or more corresponding template surface queries;
  (c) constructing one or more structured queries based on one or more trained models for queried templates and entities;
  (d) finding and selecting one or more answer phrases using constructed structured queries on a knowledge base; and
  (e) composing, or initiating the composition, of output based on the one or more answer phrases.

2. The method of claim 1, wherein the method provides concise answers to natural language questions using a structured knowledge database.

3. The method of claim 1, wherein the constructing one or more structured queries from trained models and entities comprises:
  (a) creating a basic graph pattern (BGP) with one or more trained relationship paths and entities;
  (b) optionally performing Boolean algebra on multiple BGP's to better describe the question intent; and
  (c) applying context-free grammar (CFG) on template surfaces to build nesting queries.

4. The method of claim 1, wherein the step of selecting one or more answer phrases using constructed structured queries comprises:
  (a) employing a ranking scheme considering following factors:
    (i) popularity of the templates surface;
    (ii) popularity of entities;
    (iii) probability of relation path corresponding to the template; and
    (iv) the depth of the nesting structured queries.

5. A computer system for automatically learning mappings from a natural language question to a structured query, comprising:
  (a) one or more computer systems, linked to a question answering system, the question answering system including:
    (i) a named entity recognizer for detecting one or more entity surfaces in input text so as to link a text phrase to a knowledge concept;
    (ii) a training utility for searching and organizing one or more mappings from a template surface to one or more relationship paths; and
    (iii) a training post-processing utility for normalizing and optimizing trained mapping distributions for one or more templates.

6. The computer system of claim 5, wherein question answering system permits concise answers to natural language questions using a structured knowledge database.

7. The system of claim 5, wherein the named entity recognize when executed:
  (a) extracts entity surfaces from one or more webpage links to each knowledge concept;
  (b) builds a prefix-tree based dictionary on extracted entity surfaces to link knowledge concepts; and
  (c) searches inputted text with a surface dictionary to identity one or more potential knowledge concepts.

8. The system of claim 5, wherein the post-processing utility when executed:
  (a) performs morphological normalization on template surfaces;
  (b) merges predicate distributions of templates sharing major semantic mappings that are proximate to one another based on term frequency inverse document frequency distance; and
  (c) applies matrix de-noising and correlation analysis techniques such as PCA and LSI on trained relationship path distributions for templates.

9. A computer system for automatically learning mappings from a natural language question to a structured query so as to enable obtaining an answer from a structured knowledge base based on the natural language question, comprising:
  (a) one or more computer systems, linked to a question answering system, the question answering system including or being linked to a set of structured query templates, wherein the question answering system when executed:
    (i) analyzes one or more natural language queries to generate one or more entity surfaces by accessing a named entity recognition (NER) utility;
    (ii) matches the one or more entity surfaces to one or more of the templates by applying NER to the one or more templates and applying a matching operation;
    (iii) estimates predicates by determining a relationship path distribution between the entity surfaces and the matched templates;
    (iv) constructs one or more basic graph patterns (BGPs); and
    (v) generates a structured query based on the natural language query based on the one or more BGPs.

10. A computer system of claim 9, comprising an NER module that both analyzes the natural language queries and trains the templates.

11. The computer system of claim 9, wherein the question answering system when executed automatically learns mapping rules, patterns or statistics so as to define one or more relationship paths between a question, an associated answer, and the knowledge base.

12. The computer system of claim 9, wherein two or more templates are merged, thereby merging the predicate distributions associated with the templates, by determining that the two or more templates are related.

13. The computer system of claim 12, wherein the question answering system applies a term frequency inverse document frequency operation in order to determine whether the two or more templates are related.

14. The computer system of claim 9, wherein the question answering system generates two or more structured queries, and these are ranked using one or more ranking operations.

15. The computer system of claim 14, wherein the ranking of the structured queries is based on ranking score calculated for each structured query based on one or more of:
   (a) popularity of associated templates surfaces;
   (b) popularity of associated entity surfaces;
   (c) probability of applicable relation paths corresponding to the templates; and
   (d) depth of the nesting structured queries.

16. The computer system of claim 15, wherein the question answering system applies a predetermined threshold which if exceeded, the structured queries are used to return the answer phrase, otherwise the computer system generates further results.

* * * * *